May 13, 1969  F. A. WEISS  3,443,822
EXTENSIBLE TRAILER
Filed Dec. 4, 1967  Sheet 4 of 5

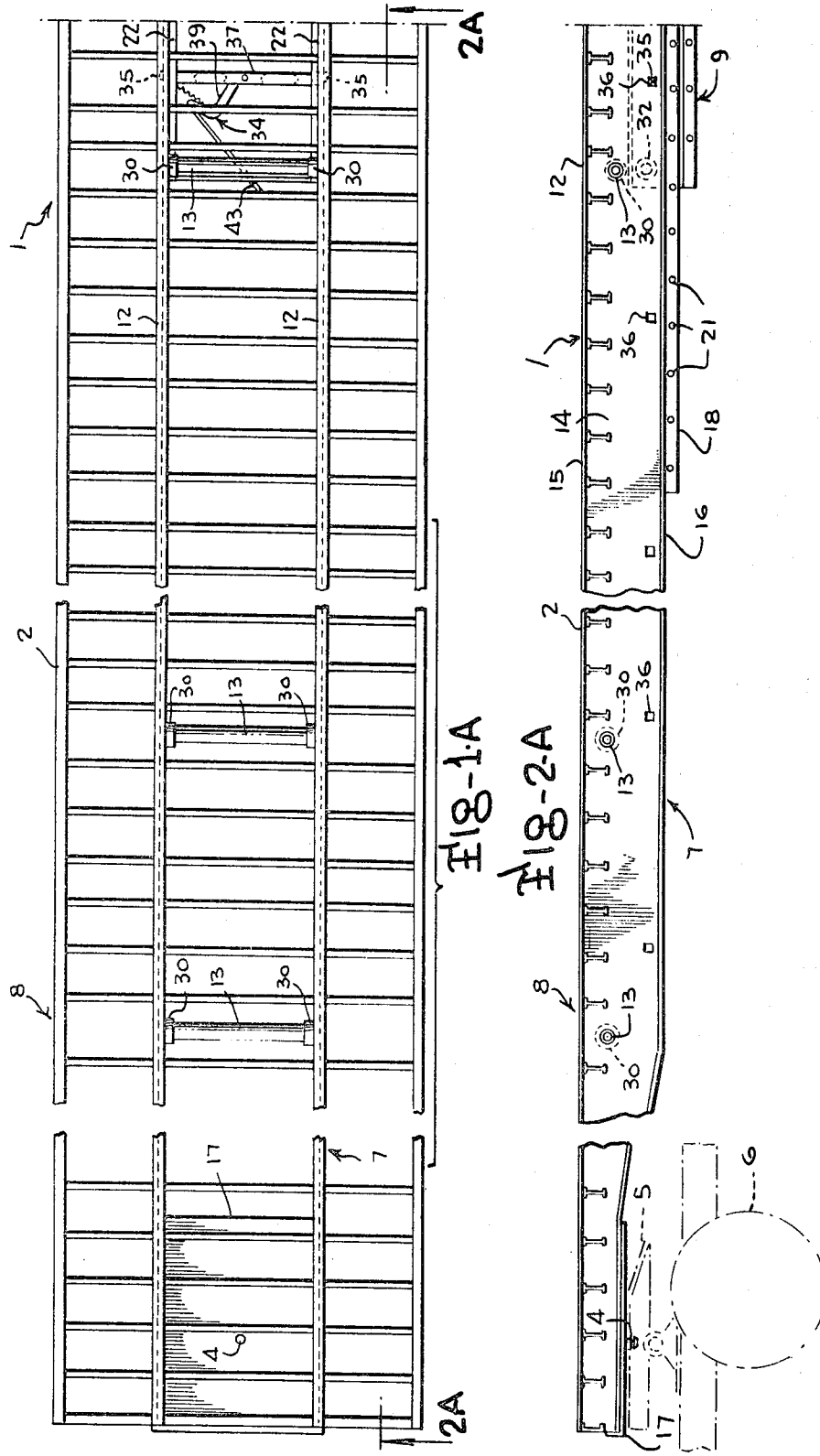

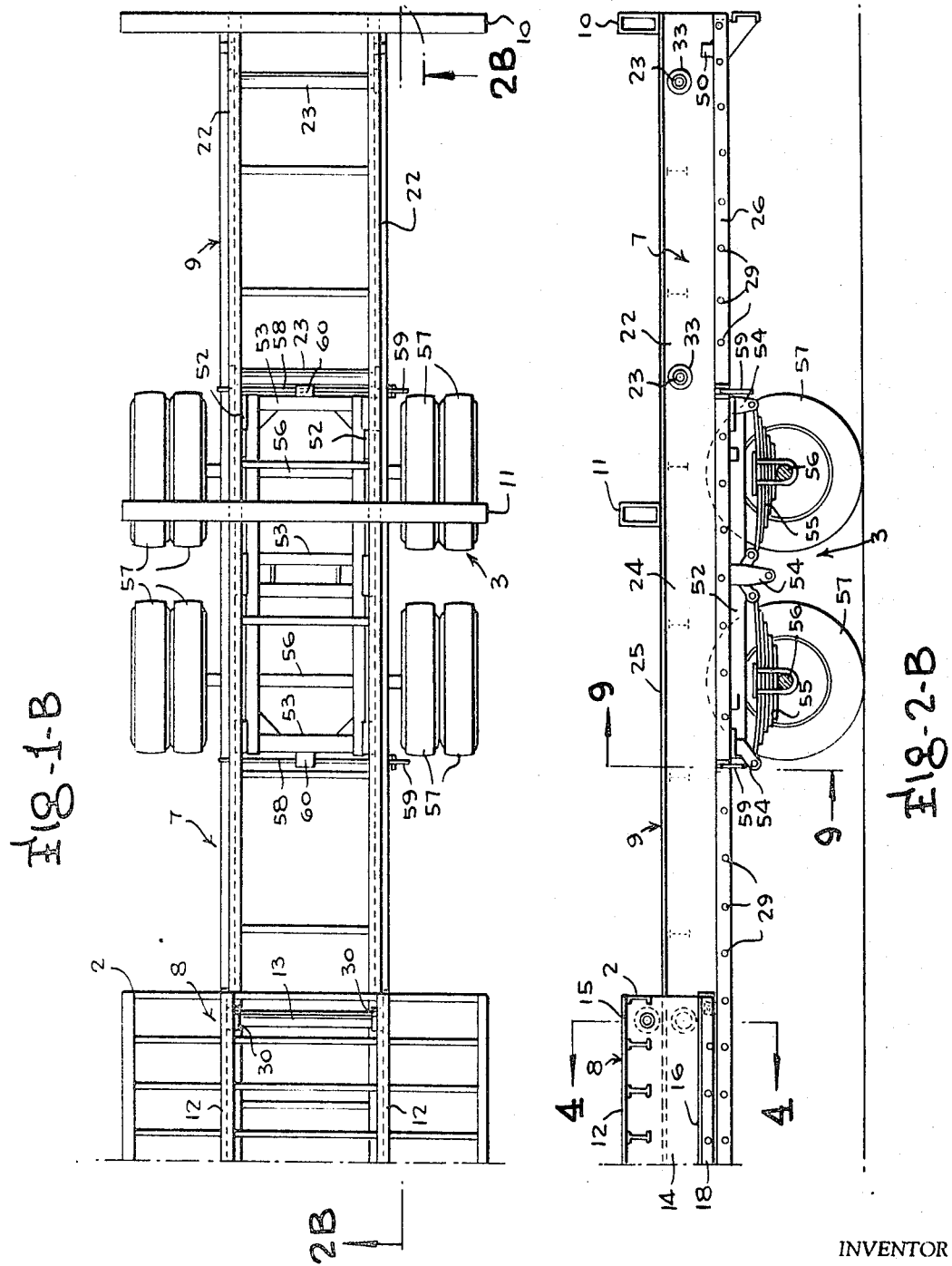

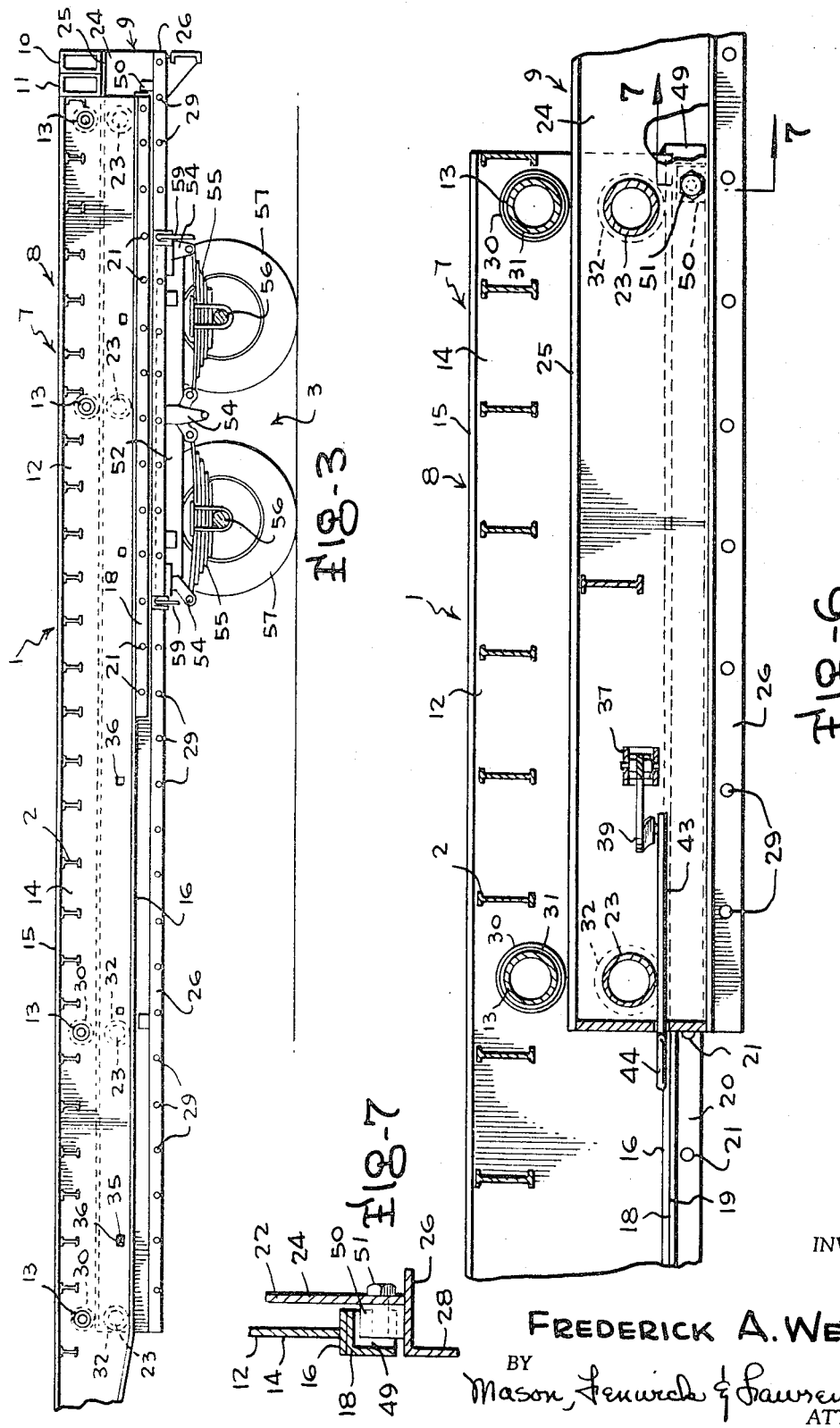

INVENTOR
FREDERICK A. WEISS
BY Mason, Fenwick & Lawrence
ATTORNEYS

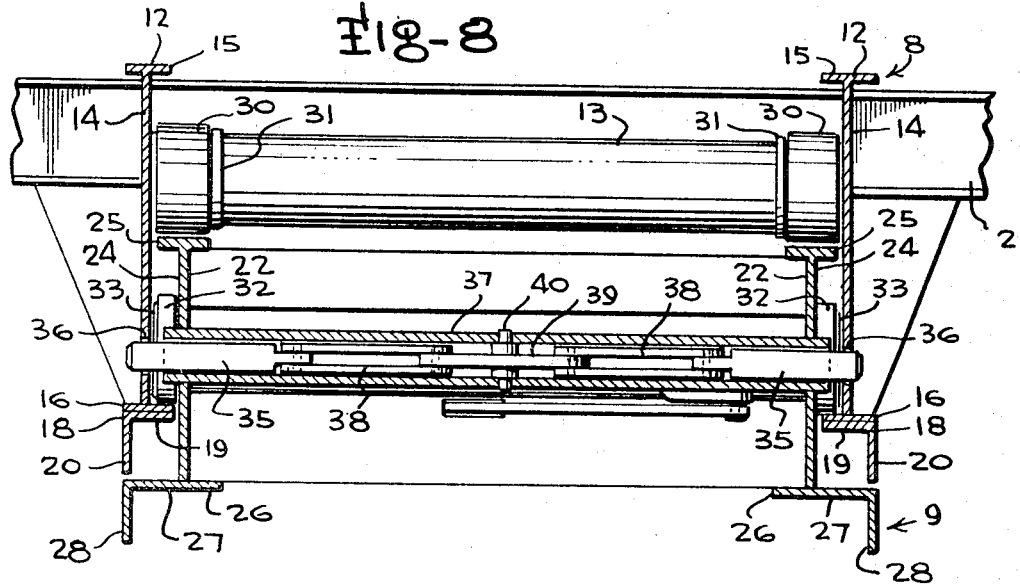
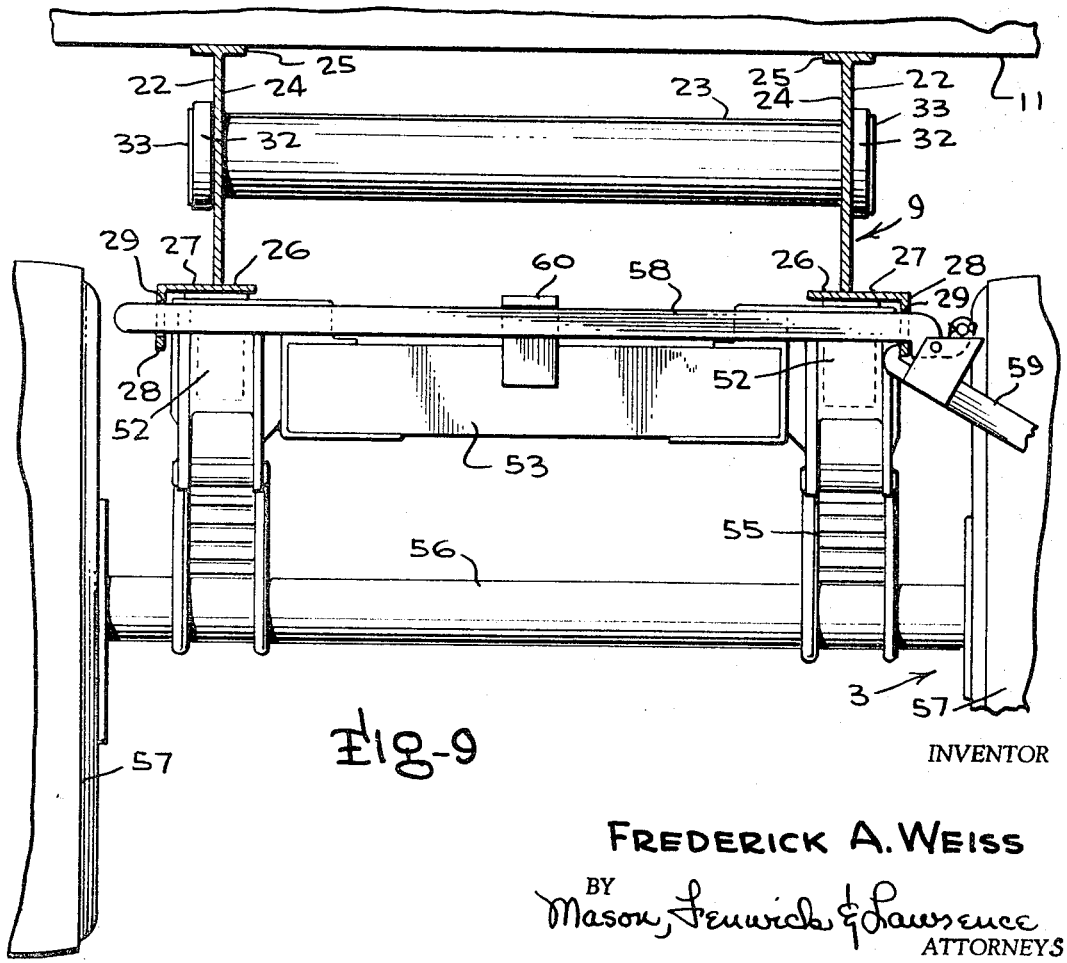

United States Patent Office 3,443,822
Patented May 13, 1969

3,443,822
EXTENSIBLE TRAILER
Frederick A. Weiss, 1148 Gypsy Lane E.,
Towson, Md. 21204
Filed Dec. 4, 1967, Ser. No. 687,731
Int. Cl. B62d 21/14
U.S. Cl. 280—34
9 Claims

ABSTRACT OF THE DISCLOSURE

An extensible trailer wherein the frame extension is telescopically mounted with respect to the main frame section, and moves on rollers formed from sleeves freely rotatable on tubular cross-struts of the frame. The extension can be locked in selected positions of adjustment, and a tandem wheel mount, which supports the frame, is adjustably connectable along the extension and the main frame. The extension can be separated from the main frame section by removing limit stops and shifting the wheel mount to a position under the main frame.

Background of the invention

This invention relates to vehicle trailers, and more particularly to trailers which can be lengthened and shortened to accommodate the trailer bed to the length of the particular load to be carried, and is an improvement over the trailer disclosed in my prior Patent No. 3,239,274, issued Mar. 8, 1966.

The trailer disclosed in my prior patent has roller-mounted, telescopic sections making up the trailer bed, with locking means to hold the sections in selected extended or contracted positions to provide a bed of desired length. This enables the operator to comply with varying local regulations concerning trailer lengths and trailer loads, and to haul long material yet have the handling advantage of a short trailer for short material hauling and on empty return trips.

While the previous construction had many advantages, it required a very long span between wheel supports when fully extended, thereby necessitating unusually heavy construction to carry maximum length loads and presenting problems of overlong wheel base dimensions, making small arc turns impossible, and required the hauling of the added weight of the extension, even when the trailer was collapsed to fully telescoped position for short bed use.

Summary of the invention

The general object of the present invention is to provide an extensible trailer which eliminates many of the disadvantages of prior extensible trailers.

A more specific object of the invention is to provide an extensible trailer having simplified, and improved, roller mountings for the telescopic bed sections.

Another object is to provide an adjustable wheel truck mounting to permit minimum practical wheelbase dimensions for a given extended trailer bed length.

A further object is the provision of an extensible trailer with an adjustable wheel mounting with provision on both the principal bed member and the extension to seat and secure the wheel mount.

Yet another object of the invention is to provide an extensible trailer with a wheel mount movable to and secureable in positions beneath the main trailer section or the extension, and which has means to permit disconnection of the extension from the main section, so that the trailer can be used without the extension.

Other objects of the invention will become apparent from the following description of one practical embodiment thereof, when taken in conjunction with the drawings which accompany, and form part of, this specification.

Brief description of the drawings

FIGURES 1A and 1B, together, show the improved trailer in top plan in fully extended condition;

FIGURES 2A and 2B, together, show the trailer in vertical, longitudinal section, the views being taken respectively on the lines 2A—2A and 2B—2B of FIGURES 1A and 1B;

FIGURE 3 illustrates in longitudinal section the trailer in fully contracted position;

FIGURE 4 is a vertical, transverse section taken on the line 4—4 of FIGURE 2B;

FIGURE 5 is a horizontal section taken on the line 5—5 of FIGURE 4;

FIGURE 6 is a vertical, longitudinal section taken on the line 6—6 of FIGURE 4;

FIGURE 7 is a fragmentary section taken on the line 7—7 of FIGURE 6;

FIGURE 8 is a vertical, transverse section taken on the line 8—8 of FIGURE 5; and FIGURE 9 is a vertical, transverse section taken on the line 9—9 of FIGURE 2B showing the adjustable wheel mount.

Description of the preferred embodiment

The trailer 1 with which the invention is concerned has a flat bed 2, and is supported near its back end upon a tandem wheel mount 3. The front end carries the usual king pin 4 for connection to the fifth wheel assembly 5 of a conventional tractor 6.

The trailer bed is carried upon a frame 7, which includes a main, forward section 8 and a rear extendable section 9, with the section 9 being mounted on the main section 8 for telescopic movement rearwardly to lengthen the frame. The main section 8 carries the bed 2, while the rear section has a fixed bolster 10 at the back end, end one, or more, longitudinaly movable load-supporting, bolsters 11. The tandem wheel mount 3 is usually connected to the rear frame section 9 when the two sections are used together.

The main, forward section 8 of the frame is composed of two, horizontally spaced, longitudinally extending I-beams 12, held in parallel relation by means of a series of transversely extending tubular struts 13. The beams 12 vertical webs 14, and top and bottom rails 15 and 16. The webs 14 are cut away at the front of the sections, in usual manner, to provide space for the tractor fifth wheel 5 when the trailer is coupled to a tractor. A plate 17 spans the beams on their undersides at the front to support the king pin 4. Horizontal beams 18 forming the bed 2 are carried by the beams 12. Along the rear portions of the beams 12, there are angle members 18, having their horizontal flanges 19 welded to the bottom rails 16 of the beams 12. The vertical flanges 20 of the angle members have longitudinally spaced openings 21 to receive the stop bars of the tandem mount when the mount is connected to the main frame section, as will be described.

The rear frame section 9 is also formed of a pair of I-beams 22 held in parallel, spaced relation by means of tubular struts 23. I-beams 22 have vertical webs 24 and top and bottom rails 25 and 26. The top rail 25 is a conventional flat rail, but the bottom rail is in the form of an angle member having a horizontal flange 27 and a vertical flange 28. The flanges 28 are on the outer sides of the members, and are in vertical alignment with the vertical flanges 20 of the angle members 18 of the main frame section when the two sections are assembled relation. The rear frame section is narrower than the main frame section, so that the webs 24 of the rear section nest between the I-beams 12 of the main section. The vertical flanges 28 of the beams 22 have openings 29, longitudinally spaced similarly to the openings 21 in the angle members 18.

For ease of telescopic movement of rear frame section 9 relative to the main section, the tubular struts 13 of the main section and 23 of the rear section carry roller members for rolling contact with the rails of the I-beams of the respective sections. The main section struts 13 have short lengths of tubing loosely fitted on their ends just inside the webs 14 of the I-beams. These form rollers 30 for rolling contact with the top rails 25 of the I-beams 22 of the rear frame section. The rollers are held against longitudinal movement along the tubular struts by annular stops 31, fixed to the struts. Struts 23 of the rear frame section project beyond the webs of I-beams 22, and their projecting outer ends carry roller sleeves 32 for rolling contact with the inwardly projecting portions of the bottom rails 16 of the I-beams of the main frame section. Outer flanges 33 on struts 23 hold rollers 32 against longitudinal movement on struts 23. Thus, the sliding rear frame section has bearing contact through rollers 32 on the bottom rails of the main frame I-beams, and is held against vertical movement or tilting by rolling contact of rollers 30 on the top rails 25 of the rear frame sections.

The trailer is held in selected positions of length adjustment by means of a locking mechanism 34, which has locking pins 35 to extend through selected locking openings 36 in the webs 14 of the I-beam of the main frame section. Pins 35 are slidable in the open ends of a tube 37 that extends across the rear frame section and through the webs 24 of the I-beams 22. The pins are relatively short, and are pivotally connected to the ends of links 38 which, in turn, are pivotally connected to the ends of an operating bell-crank 39. The bell-crank is pivotally mounted, as at 40, in the tube, and has a control arm 41 projecting through a slot 42 in the tube. An actuating rod 43 is connected to control arm 41, and has a handle 44 at its outer end. A pull on the handle will rock bell-crank 39 and withdraw the pins 35 from the openings 36 in the main frame section, leaving the rear frame section free to slide. A stop 45 on rod 43 is engageable with the side of an opening 46 in a crossbar 47 bridging the I-beams 23 to hold the stop mechanism in released position. A spring 48 connected to the bell-crank and the web of one of the I-beams 23 urges the locking mechanism to locking position when the stop 45 is released.

When the locking mechanism 34 is operated to retract pins 35, the rear frame section can be moved to extend the trailer length. The limit of extension is controlled by means of abutment lugs 49 fixed to the angle members 18 on I-beams 13, and stop lugs 50 removably secured to the webs 24 of I-beams 23 by means of bolts 51 (See FIGURES 6 and 7). When stop lugs 50 are removed, the rear frame section of the trailer can be entirely withdrawn from the main section, as will be described.

The tandem wheel mount 3 may be any of a number of well known assemblies which can be moved longitudinally of the vehicle frame and held in positions of adjustment on the frame. The mount is shown as having spaced, parallel side rails 52, held in spaced relation by means of cross members 53. The side rails carry the usual hangers 54, which support springs 55. Axles 56 carrying wheels 57 are fixed to the springs in usual manner. The wheel mount is held against movement longitudinally of the vehicle frame by means of stop bars 58, which are inserted through the openings 29 in the vertical flanges 28 of the rear section of the frame. The openings 29 are spaced along the frame so that when the stop bars are inserted at each end of the wheel mount, the wheel mount is held against forward or rearward movement relative to the frame. The stop bars are of conventional construction, and are held in place by hook latches 59, which engage the vertical flanges 28 of the bottom rails of the I-beams 22 of the rear frame section. The mount may be tied to the frame in any convenient manner to prevent separation of the frame and mount upon vertical movement. This is usually done by means of angle brackets, and such brackets 60 are shown attached to the end crossmembers 53 of the wheel mount frame. The brackets overlie the stop bars and, as the stop bars are mounted through openings in the frame, will hold the wheel mount to the frame.

If the wheel mount is in position beneath the rear frame section, as just described, and it is desired to move the mount forwardly, the front stop bar will be unlatched, and withdrawn from the openings 29. It will then be reinserted in openings 29 at a selected new position. The brakes on the wheels will be set, and the vehicle backed to cause the extension frame to slide over the rails of the wheel mount until the forward end of the wheel mount strikes the relocated forward lock bar 59. Rearward movement of the vehicle is stopped, and the rear lock bar is removed from its original position and put into a new position adjacent the back end of the wheel mount frame. It is to be noted that the forward holddown bracket 60 will override the relocated lock bar as the mount moves into position, and the relocated rear lock bar will move into position beneath the rear holddown bracket, thus latching the mount to the frame to prevent vertical separation. To move the wheel mount rearwardly a reverse operation is performed.

When it is desired to extend or shorten the vehicle frame, the lock pin operating handle 44 is pulled to withdraw the locking pins from the openings 36 in the webs 14 of the forward frame I-beams, to release the two sections. With the rear wheel brakes set, the vehicle is drawn forward to elongate the frame, or moved rearwardly to shorten the frame. After the proper length has been secured, the handle 44 is operated to release pins 35 and allow the spring 48 to return them to locking position in the openings 36 of the forward frame.

There are times when it may be desirable to remove the rear frame section and use only the forward section. To accomplish this, the locking pins 35 will be realeased and the rear section of the frame extended to its fullest so that the stops 49 and 50 are in engagement. The forward stop bar 58 of the wheel mount will then be removed and the vehicle backed until the rear section 9 of the frame passes completely off of the wheel mount frame, and the forward section 8 of the frame drops to seating position on the wheel mount. With the stop bar 58 in proper position in one of the openings 21 in the angle member 18 of the forward frame section, the vehicle can be backed until the wheels are against the stop bar. The rear stop bar can then be removed from the rear section of the frame and put in position at the back of the wheel mount. By removing stops 50 the rear section of the frame will be free to be drawn completely out of its telescoping arrangement with the forward section. The rear section can be picked up by a fork lift, for example, and withdrawn completely from the front section and stored for subsequent use.

If it is desired to add the rear section to the forward section, the rear section may be lifted to proper height by a fork lift and moved into telescoping relation with the forward section. While the fork lift is available, the rear stop bar 58 of the wheel mount may be removed and the vehicle drawn forward as the fork lift moves with it. This will enable the operator to lift the frame the distance necessary to raise the bottom of the rear section above the rails of the wheel mount so that the wheel mount can move into position under the back frame section. The two frame members can be locked together by resetting the pins 35, the stop 50 can be remounted to prevent separation of the two sections, and the wheel mount can be locked in selected position under the rear section of the frame so that the vehicle, in elongated form, is again ready for use.

I claim:
1. An extensible trailer comprising, a main frame section and a rear frame section telescopically interfitted, each frame section including parallel I-beams held in spaced relation by means of cross-struts which at least in part are tubular, sleeves freely mounted for rotative movement on tubular portions of the cross-struts adjacent the I-beams, and stops on the cross-struts to limit movement of the sleeves away from the I-beams lengthwise of the cross-struts, the sleeves on the cross-struts of the main frame section arranged for rolling contact with the I-beams of the rear frame section, and the sleeves on the cross-struts of the rear frame section arranged for rolling contact with the I-beams of the main frame section.

2. An extensible trailer as claimed in claim 1 wherein, one of the frame sections carries a locking member, and the other of the frame sections has openings along its I-beams to receive the locking member to hold the two frame sections in selected positions of extension adjustment.

3. An extensible trailer as claimed in claim 2 wherein, there are limit stops on each frame section arranged for abutment when the sections are telescoped to full extension, the limit stops on one frame section being removable to allow separation of the two sections.

4. An extensible trailer as claimed in claim 3 wherein, there is a wheel mount adjustably positionable along the trailer, each frame section having means to connect the wheel mount in selected positions of adjustment.

5. An extensible trailer as claimed in claim 3 wherein, the I-beams of each frame section have bottom rails including vertical flanges having openings spaced therealong, and there are means associated with the wheel mount to engage the openings in the vertical flanges to hold the wheel mount in desired positions of adjustment.

6. An extensible trailer comprising, a main frame section, means on the main frame section to connect to a towing vehicle, a wheel mount, means on the main frame section to releaseably and selectively connect the wheel mount in positions of adjustment longitudinally of the main frame section, a rear extension frame section telescopically interfitted into the main frame section to provide length adjustment of the trailer, means to hold the rear frame section in selected positions of extension relative to the main frame section, and means on the rear frame section to releaseably and selectively connect the wheel mount in positions of adjustment longitudinally of the rear frame section when the rear frame section is extended relative to the main frame section.

7. An extensible trailer as claimed in claim 6 wherein, each frame section carries limit stops with the stops on the two frame sections being engageable when the trailer is fully extended to prevent separation of the frame sections.

8. An extensible trailer as claimed in claim 7 wherein, the limit stops on one frame section are removable, whereby the wheel mount can be connected to the main frame section and the rear frame section can be removed from the main frame section.

9. An extensible trailer as claimed in claim 8 wherein, the means along the frame section for connection to the wheel mount includes each frame section having members with vertical flanges having openings spaced longitudinally of the frame sections, and there are means associated with the wheel mount to engage the openings in the vertical flanges to hold the wheel mount in desired positions of adjustment.

References Cited

UNITED STATES PATENTS

| | | | |
|---|---|---|---|
| 2,676,815 | 4/1954 | Bennett | 280—80 |
| 2,727,758 | 12/1955 | Smith | 280—34.1 |
| 3,061,332 | 10/1962 | Goulden | 280—415 |
| 3,087,741 | 4/1963 | De Lay | 280—81 |
| 3,126,209 | 3/1964 | Jewell | 280—81 |
| 3,239,274 | 3/1966 | Weiss | 298—17 |

FOREIGN PATENTS 137,943    7/1950    Australia.

BENJAMIN HERSH, *Primary Examiner.*
ROBERT R. SONG, *Assistant Examiner.*

U.S. Cl. X.R.
280—81, 415